United States Patent [19]
Whittaker et al.

[11] 3,812,240
[45] May 21, 1974

[54] PRODUCTION OF HIGHLY ORDERED GRAPHITE PARTICLES

[75] Inventors: Mack P. Whittaker, Johnson City; Lloyd I. Grindstaff, Elizabethton, both of Tenn.

[73] Assignee: Great Lakes Carbon Corporation, New York, N.Y.

[22] Filed: Oct. 13, 1971

[21] Appl. No.: 188,941

Related U.S. Application Data

[63] Continuation-in-part of Ser. No. 26,142, April 6, 1970, abandoned.

[52] U.S. Cl.................... 423/448, 423/449, 264/29, 252/301.1
[51] Int. Cl............................................. C01b 31/04
[58] Field of Search ....... 423/448, 449, 450; 264/29

[56] References Cited
UNITED STATES PATENTS
3,552,922   1/1971   Ishikawa et al................ 423/447 X

OTHER PUBLICATIONS

Brooks et al., "Chemistry and Physics of Carbon," Vol. 4, 1968, P. L. Walker Ed., pages 275–285.

Primary Examiner—Edward J. Meros
Attorney, Agent, or Firm—Donald R. Cassady

[57] ABSTRACT

Highly ordered graphite particles are prepared by heating a mesophase-forming pitch to form discrete mesophase spherulites, separating, and thereafter carbonizing and graphitizing the mesophase spherulites while preventing coalescence thereof. Coalescence is prevented by coating, surface oxidizing, or carbonizing the mesophase spherulites in such a manner so as to isolate each spherulite. The graphite product is particularly useful in the fabrication of nuclear fuel elements.

5 Claims, No Drawings

PRODUCTION OF HIGHLY ORDERED GRAPHITE PARTICLES

CROSS REFERENCE TO RELATED APPLICATIONS

This application is a continuation-in-part of copending application Ser. No. 26,142, filed Apr. 6, 1970, now abandoned.

BACKGROUND OF THE INVENTION

During carbonization of materials such as petroleum residuals and coal-tar pitches, a transformation from the isotropic pitch phase to optically anisotropic mesophase occurs at temperatures in excess of 400°C. "Mesophase" has been described and characterized by Brooks and Taylor, "Chemistry and Physics of Carbon", Vol. 4, p. 243 et seq., P. L. Walker, Ed. Marcel Dekker, Inc., New York. Mesophase is a highly anisotropic, initially essentially spherical material consisting of relatively large molecules arranged parallel to each other with their long axes normal to the boundaries of the spheres. These spherical units become visible through polarized light microscopy when they reach a size of about 0.1 to 0.5 micron in diameter. Under the influence of heat, these units continue to grow and develop at the expense of the isotropic pitch surrounding them forming a fusible plastic mass which is insoluble in substantially all organic solvents. Complete carbonization of such materials is characterized by complete conversion to the anisotropic mesophase which coalesces into a plastic mass. Continued heating, and in general, an increase in temperature causes the coalesced mesophase to irreversibly harden resulting in the well-known cokes in the carbon industry.

In preparing nuclear fuel cell elements the nuclear fuel and carbon are dispersed in a resin or pitch matrix and cured. The preferred form of carbon for such a use consists of large crystallites in an isotropic mass.

In U.S. Pat. No. 3,245,880, Martin et al. teach the use of graphite bodies prepared by milling fully formed graphite in the fabrication of nuclear fuel elements and the like. In order to obtain isotropic bodies for this use the inventors state that graphitization of the raw coke starting material be carried out either (a) after the particles have been heat treated under mechanical pressure; or (b) after the particles have been thoroughly mixed with a plasticizer; or (c) after the crystallite arrangement of the particles has been disordered in some other suitable manner. If the raw coke particles are calcined or graphitized before any of these alternatives, then graphitized bodies prepared from such particles and a binder are incapable of, or do not result in, the achievement or production of graphitized bodies, in accordance with their invention, which are particularly well suited for use in nuclear reactors.

SUMMARY OF THE INVENTION

We have found that an isotropic mass of large anisotropic crystallites can be prepared from the graphite flour of this invention. Such graphite flour is prepared by the controlled heating of a mesophase-forming pitch or like material to form discrete spherulites of mesophase, separating the mesophase from the pitch, and carbonizing and graphitizing of the mesophase without allowing coalescence of the spherulites. This graphite flour can be used for the fabrication of nuclear fuel elements and moderators.

The mesophase flour of this invention consists primarily or essentially of highly ordered, oriented, crystallites or anisotropic, spherulite particles in contrast to that of Martin et al. which consists of highly disoriented crystallite particles. Additionally, the spherulite particles of flour are essentially single crystals and are smooth spheres, particularly advantageous to various fabrication techniques since they are not affected by the aligning forces of the usual mechanical methods of fabrication of the graphite body.

DETAILED DESCRIPTION OF THE INVENTION

It is known that when a pitch or similar material which forms a graphitizable carbon is heated to about 400°C. or higher, nucleation occurs and small spherulites of an insoluble material (mesophase) form. The term "graphitizable, carbon-forming pitch" as used herein and in the appended claims means coal tar pitch, vertical retort pitch, the petroleum ether-soluble fraction of coke oven pitch, the toluene-soluble fraction of coke oven pitch, the pyridine-soluble fraction of coke oven pitch, virgin or synthetic petroleum residues, or pitches, vitrinites from bituminous coals, naphthacene, polyvinyl chloride, and the like. The starting pitch or like material is heated to about 400 to 500°C. at which point mesophase is formed. Mesophase separates in the form of discrete spheres as large as $50\mu$ in diameter before coalescing into a plastic mass. Mesophase spheres are recovered and purified by extractive removal of the quinoline (or creosote oil) soluble portion from the heat treated product before coalescence. Such removal can be effected by pressure filtration of the product at above about 200°C. or by the solubilization of the unconverted pitch in light creosote oil, pyridine, quinoline, toluene, or like solvent and filtration or centrifugation to separate the phases. The unconverted pitch can be reheated to prepare more mesophase.

The mesophase particles or "flour" ($50~\mu$ or less) are then carbonized by heating to a temperature of about 550 to 900°C. in a manner so as to isolate each particle to prevent or minimize coalescence. Such heating can be accomplished in a fluidized or moving bed, a vibrating belt, or the like, or by allowing the particles to free-fall in a heated tube with or without the presence of a countercurrent draft of inert gases.

Alternatively, the mesophase spherulites can be coated with an insulative resinous material to prevent coalescence when carbonized in bulk. The insulative resin can be applied by spraying, vapor deposition, immersion, or like method either with or without a diluting solvent. Diluting solvents must be volatile at below the softening temperature of the mesophase. Examples of resin coatings can include epoxy, furfural, phenol-formaldehyde, polyvinyl acetate, polyalkylenes resins as for example polyethylene, polypropylene, and polyimides and the like.

Alternatively, the spherulites can be surface oxidized by heating the uncarbonized flour in a controlled oxidizing atmosphere to a temperature below the coalescence temperature. Such oxidizing atmosphere can contain oxygen, ozone, stream, nitrogen oxides, or the like oxidative substances.

The oxidative surface treatment of the spherulites and the carbonization step can also be carried out as one process by slowly heating the particles to carbonization temperatures in the presence of a controlled oxidizing atmosphere.

In another embodiment of the invention, the spherulites can be insulated from coalescence by coating them with carbon or graphite as for example lamp black or the like.

In a preferred embodiment, coal tar pitch is heated to 450°C. for 2 to 4 hours until the mesophase spherulites formed are about 10 μ in diameter. The whole is then pressure filtered at about 200°C. and the liquid pitch filtrate reprocessed for additional quantities of mesophase. The recovered mesophase spherulites are surface oxidized by heating to 200°C. on a vibrating belt in an oxygen-containing atmosphere. Alternatively, a light creosote oil solution containing about 5 to 10 percent by weight of epoxy resin is added to the mesophase particles. Either method provides a surface coating on the particles to prevent coalescence thereof during the subsequent carbonization step.

The surface protected particles are carbonzied by heating to 550°C. until they are essentially fully cross-linked, then graphitized to 3,000°C. in the usual manner well-known to the art.

The graphite product of this invention is useful in the fabrication of nuclear reactor elements in which a fissionable material e.g., uranium oxide, uranium carbide, plutonium, or other fertile material and the moderating graphite are arranged in the reaction chamber and the heat generated therein is removed. For this purpose, the graphitized mesophase of this invention are mixed in the desired proportion with the fissionable or fusionable material and fabricated into a composite bar or other suitable shapes using an epoxy or similar binder as the matrix material.

The graphite product of this invention is also useful in the fabrication of reflector mantles which can surround the reaction zone in nuclear reactors and serve to reflect a portion of the neutrons leaving the reaction zone. For this use, it is desirable to fabricate graphite bodies in the form of plates, blocks, tubes, or spheres typically one-half inch in diameter or larger, or in the form of other shaped "massive structural" bodies.

Such shaped pieces are made by pressing or molding or shaping the above described graphitized mesophase particles and binder system into the desired size and shape followed by baking and graphitizing procedures. The pressing or shaping of the carbonaceous material is sometimes carried out while or after it is heated, but may, depending upon the starting materials being employed, also sometimes be carried out at room temperature.

Several additional methods for making the graphitized mesophase flour may be employed and will be described hereinafter, but in all instances the formed and graphitized flour to be used in nuclear reactors in accordance with the present invention is made in such a manner that the arrangement of crystallites in the graphitized flour is in a highly ordered, oriented state.

The ordered arrangement within the spherulites in the carbonaceous materials can be determined by X-ray diffraction and magnetic techniques and is manifested in the graphitized bodies by high coefficients of thermal expansion.

The following examples will further illustrate the preparation of the graphite flour of this invention.

Example 1

Petroleum-based coker feedstock, i.e. a vacuum reduced crude oil, was heated at 420°C. for 16 hours. The material was cooled to ambient room temperature and ground to −200 mesh. The ground solids were extracted with 25 volumes of quinoline. The residue was washed with benzene and air dried at 80°C. for 2 hours.

The dried mesophase flour thus prepared was dispersed in a solution of 6.5:1, epoxy resin (Epon resin 826, Shell Oil Company) m-phenylenediamine in an equal volume of methyl ethyl ketone and the liquid phase removed by decantation. The solids residue was dried at low heat (below 110°C.) to yield a partially agglomerated mass of particles. The particles were broken up by soft rubbing or shaking through a fine screen, and the mass was carbonized by heating at 850°C. in a nitrogen atmosphere at a heat-up rate of 14°C./minute and holding the temperature at 850°C. for 60 minutes to yield an unfused carbon flour. The thus produced carbon flour can be graphitized by heating to 2,500° to 3,000°C. in a manner well known to the art.

Example 2

Petroleum-based pitch was converted to mesophase flour by the method of Example 1. The flour was then suspended in a column of upward moving air at a flow rate continuously adjusted to keep the particles in suspension. The air was heated to 400°C. over a 15 minute period to surface-oxidize the flour particles, then to 850°C. at 14°C./minute in a nitrogen atmosphere and held at 850°C. for 1 hour. The carbonized flour thus produced can be graphitized by heating to 2,500 to 3,000°C. in a manner well known to the art.

What is claimed is:

1. A process for making graphite particles comprising 1. heating a graphitizable, carbon-forming pitch to about 400°C. to 500°C. to obtain discrete spherulites of mesophase of 50 microns or less in diameter;
   2. separating the mesophase spherulites from the pitch;
   3. coating or oxidizing the surface of the mesophase spherulites to prevent coalescence during carbonization; and
   4. carbonizing and graphitizing the spherulites.

2. The process of claim 1 wherein step 3 comprises coating the mesophase spherulites.

3. The process of claim 1 wherein step 3 comprises coating the mesophase spherulites with an epoxy resin.

4. The process of claim 1 wherein step 3 comprises surface oxidizing the mesophase spherulites.

5. The process of claim 1 wherein step 3 comprises coating the mesophase spherulites with carbon.

* * * * *